(12) United States Patent
Jarrier et al.

(10) Patent No.: US 8,477,043 B2
(45) Date of Patent: Jul. 2, 2013

(54) MEMBER INTEGRITY MONITORING SYSTEM AND METHOD

(75) Inventors: Etienne Rene Jarrier, Basingstoke (GB); Steve David Hiner, Salisbury (GB); Simon Charles Larcombe, Southampton (GB)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 12/884,814

(22) Filed: Sep. 17, 2010

(65) Prior Publication Data

US 2012/0068851 A1    Mar. 22, 2012

(51) Int. Cl.
*G08B 21/00* (2006.01)
(52) U.S. Cl.
USPC .................. 340/679; 340/539.26; 340/870.16
(58) Field of Classification Search
USPC ................... 340/679, 870.01, 870.3, 870.31, 340/870.32, 870.35, 870.36, 539.26, 870.16
See application file for complete search history.

(56) References Cited

U.S. PATENT DOCUMENTS

| | | | | |
|---|---|---|---|---|
| 3,900,968 A | * | 8/1975 | Shigyo | 451/67 |
| 4,203,703 A | * | 5/1980 | Koeller | 415/113 |
| 5,284,164 A | * | 2/1994 | Andrews et al. | 131/280 |
| 5,303,000 A | * | 4/1994 | Benker et al. | 355/41 |
| 5,663,710 A | * | 9/1997 | Fasig et al. | 340/601 |
| 6,798,896 B2 | * | 9/2004 | Watanabe et al. | 382/101 |
| 7,167,575 B1 | * | 1/2007 | Nichani et al. | 382/103 |
| 2009/0079841 A1 | * | 3/2009 | Leard et al. | 348/222.1 |

FOREIGN PATENT DOCUMENTS

| | | | |
|---|---|---|---|
| EP | 1760292 A2 | | 3/2007 |
| EP | 1 760 292 | * | 7/2007 |
| JP | 2006009591 | | 1/2006 |
| WO | 2008029113 A1 | | 3/2008 |

* cited by examiner

*Primary Examiner* — Daniel Previl
(74) *Attorney, Agent, or Firm* — Cantor Colburn LLP

(57) ABSTRACT

A monitoring system for monitoring the integrity of a member disposed within a machine includes an image analyzer configured to receive image data from an imaging device and to determine an amount of radiation incident on one or more of one or more pixels of the imaging device. The monitoring system also includes a monitor coupled to the image analyzer and configured to generate an alarm in the event an amount of radiation on one or more of the one or more pixels exceeds a limit.

30 Claims, 4 Drawing Sheets

MEMBER INTEGRITY MONITORING SYSTEM AND METHOD

BACKGROUND OF THE INVENTION

The subject matter disclosed herein relates to monitoring and, in particular, to monitoring the integrity of a member.

Many types of machines rely on compressed air to operate. For example, a typical turbomachine includes a compressor that draws in and compresses air. The compressed air is provided to a combustor (or burner). The hot air output of the combustor may be provided, for example, to a turbine to extract power from the hot air flow. In many cases it may be desirable to filter the air before providing it to the compressor. Of course, many other types of machines also require filtered air.

BRIEF DESCRIPTION OF THE INVENTION

According to one aspect of the invention, a monitoring system for monitoring the integrity of a member disposed within a machine is disclosed. The monitoring system of this embodiment includes an image analyzer configured to receive image data from an imaging device and to determine an amount of radiation incident on one or more of one or more pixels of the imaging device. The monitoring system of this embodiment also includes a monitor coupled to the image analyzer configured to generate an alarm in the event an amount of radiation on one or more of the one or more pixels exceeds a limit. In this embodiment, the alarm indicates that the member has failed.

According to another aspect of the invention, a method of monitoring a member in an air duct of a machine is disclosed. The method of this embodiment includes receiving image data from an imaging device disposed within the air duct, the imaging data including information related to an amount of radiation incident on pixels of the imaging device; comparing the image data to radiation limits; and generating an alarm when the image data exceeds the radiation limits.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As discussed above, many types of machines may require filtered air to operate. For example, in a turbomachine, one or more filters in a filter house clean the input air of contamination before it enters the compressor. It is important to ensure the one or more filters in the filter house are operating correctly during the operation and without having to shut the machine down to inspect the filters. Accordingly, one or more embodiments of the present invention are directed to systems and methods that monitor the integrity of an air filter in a turbomachine while the turbomachine is operating.

Figure 1:
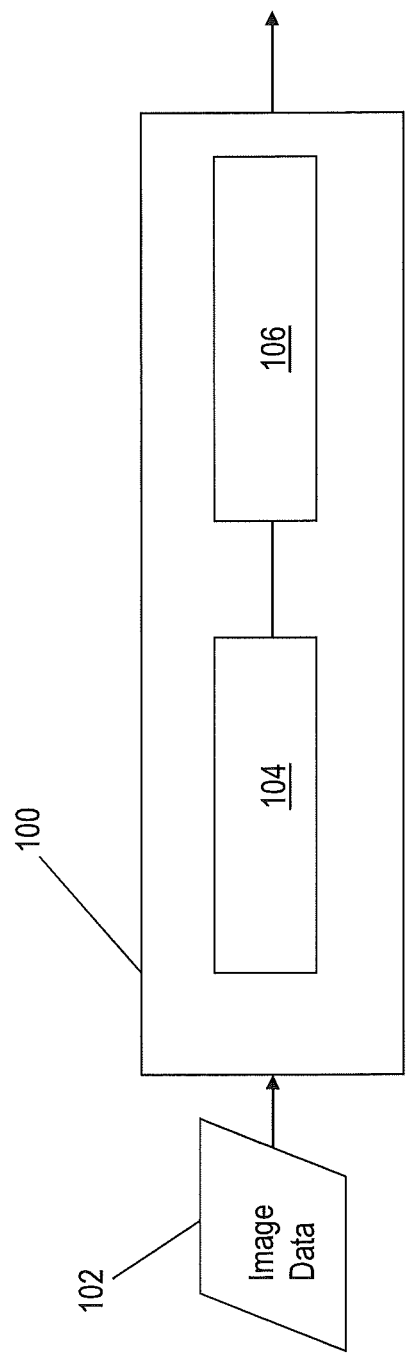
FIG. 1 is a block diagram of a monitoring system according to one embodiment.

FIG. 1 shows an example of a monitoring system 100 according to one embodiment. The monitoring system 100, generally, monitors the integrity of a member. The monitoring system 100 receives image data 102. The image data 102 includes digital or analog information related to a scene. In a particular embodiment, the image data 102 is a digital representation of a scene in a field of view of an imaging device. The image data 102 may be received from any of one or more locations. For example, in one embodiment, the image data 102 is received from one or more imaging devices (not shown) coupled to the monitoring system 100. In another example, the image data 102 is received from a database or other information storage medium such as a computer disc.

The illustrated monitoring system 100 includes an image analyzer 104. The image analyzer 104 is configured to analyze the image data 102 in one embodiment. In particular, the image analyzer 104 is configured to analyze the image data 102 to determine the intensity of a particular type of radiation type incident on each pixel of an imaging device in one embodiment. The radiation may be one of: visible light, ultraviolet light, infrared or any other type of radiation.

The monitoring system 100 shown in FIG. 1 also includes a monitor 106. The monitor 106 is configured to analyze the intensity or radiation received by each pixel of an imaging device as determined, for example, by the image analyzer 104. In one embodiment, the monitor 106 is configured to determine if the amount of light received by any of the pixels has increased or changed by a significant amount. Such an increase may indicate that a member disposed between a radiation and an imaging device has developed a hole or other defect.

Figure 2:
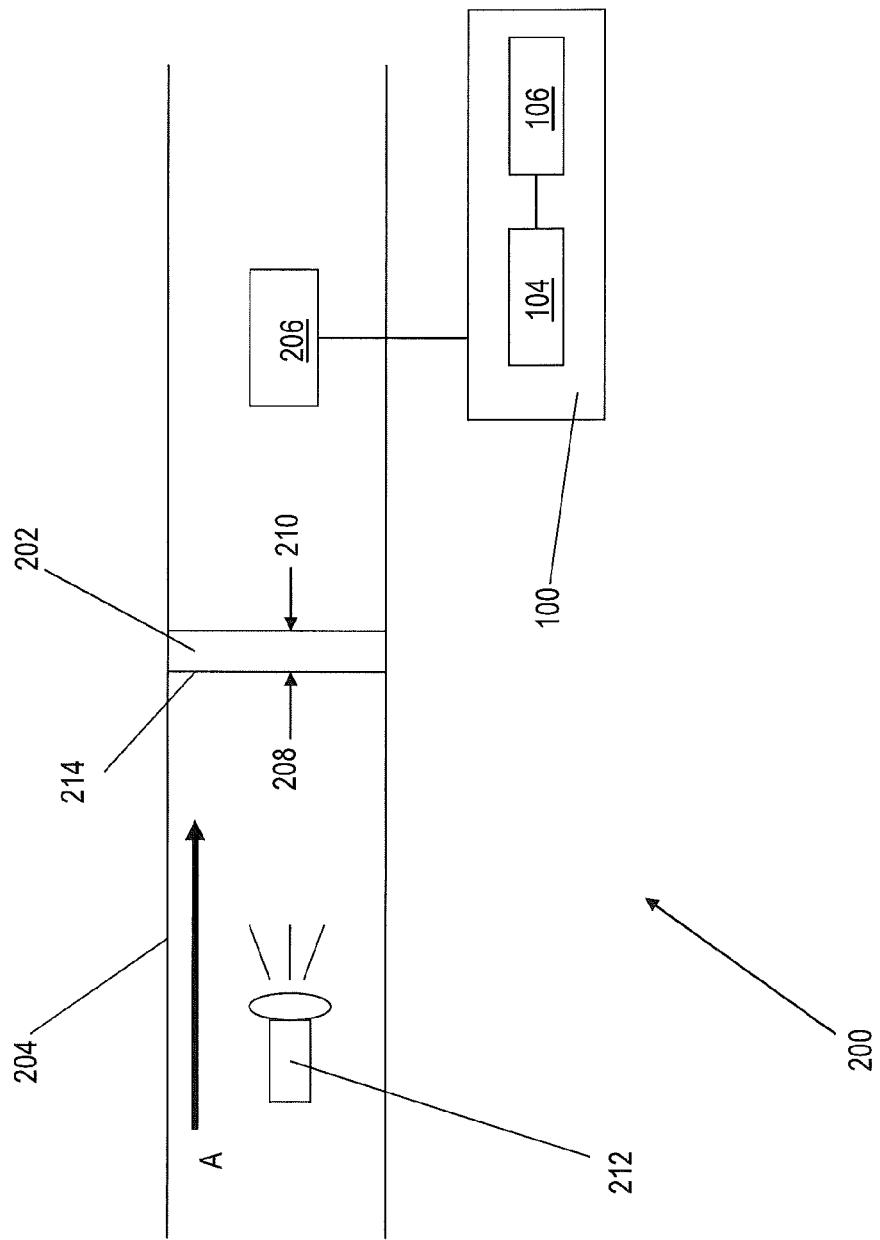
FIG. 2 is a block diagram of a monitoring system in an example operating environment.

FIG. 2 shows the monitoring system 100 in an example environment 200. The environment 200 includes a member 202 disposed within a flow path 204. In one embodiment, the flow path 204 provides air to a compressor (not shown). The compressor is part of a turbomachine in one embodiment. In one embodiment, an air duct forms the flow path 204.

Figure 3:
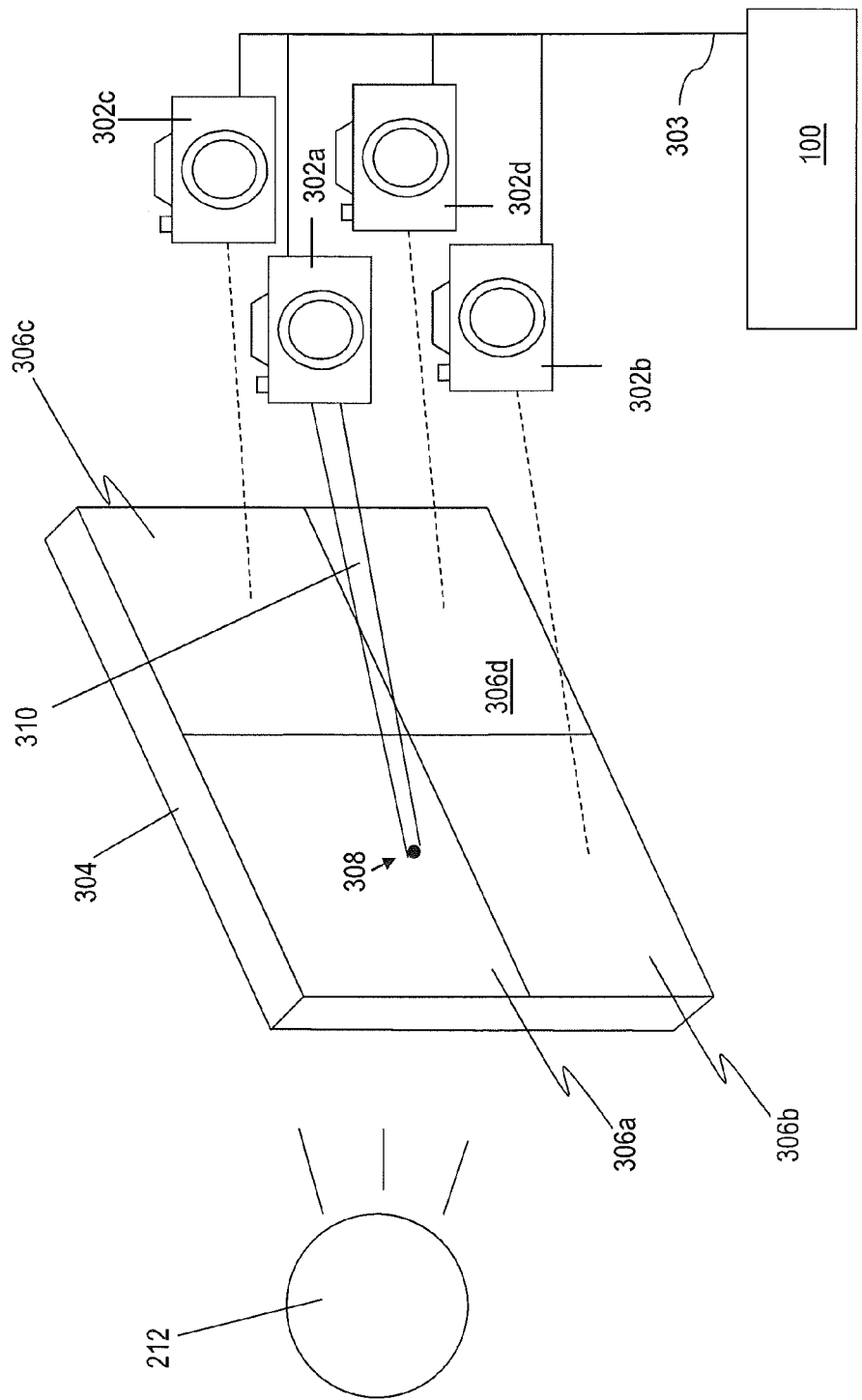
FIG. 3 is a block diagram showing an example environment from which information may be collected.

In one embodiment, the member 202 is a filter. The filter may filter air or any other gas. In such an embodiment, the filter may include one or more filter portions 306 as shown in FIG. 3. Each filter portion is secured to a casing 214 at or near its outer edges. The filter portions 306 themselves may tear or may pull away from the casing. In either case, the filter may be deemed "failed."

In FIG. 2, the monitoring system 100 is coupled to an imaging device 206. The imaging device 206 is a camera in one embodiment. The imaging device 206 is disposed within the flow path 204. In operation, air flows through the flow path 204 in the direction indicated by arrow A. The member 202 includes an upstream side 208 and a downstream side 210. As shown in FIG. 2, the imaging device 206 is, thus, "downstream" of the medium 202 as it is closer to the downstream side 210 than the upstream side 208.

In FIG. 2 a radiation source 212 is located within flow path 204. The radiation source 212 may direct radiation at least partially towards the upstream side 208 of the member 202. That is, in one embodiment, the radiation source 212 is upstream of the member 202.

The radiation source 212 may be a single element or may include multiple individual sources. The radiation source 212 may produce radiation in the form of creating light in one embodiment. The light may be any type of light, such as ultraviolet, infrared or visible light.

The imaging device 206 measures the amount of radiation passing through the member 202. In the event that a hole is formed in the member 202, the hole will serve as a location for increased radiation passage. The hole may indicate a tear in the member 202 or that the member 202 is pealing away from its casing 214.

In an alternative embodiment, the imaging device 206 is disposed upstream of the medium 202 and the radiation source 212 is disposed downstream of the medium 202. Furthermore, while in FIG. 2 the monitoring system 100 is shown coupled to the imaging device 206, it shall be understood that such a connection is optional. Indeed, the monitoring system 100 may receive information from the imaging device 206 indirectly. For example, the monitoring system 100 may receive information from the imaging device 206 that has been stored on a disc or other storage medium or that has been transmitted through one or more intermediary devices.

In operation, the radiation source 212 directs radiation towards the member 202. Of course, the radiation could be directed towards a reflective surface such as a mirror (not shown), which then directs it to the member 202. Such an arrangement may allow for active control directing the radiation. A certain amount of this radiation passes from the upstream side 208 to the downstream side 210 when the member 202 is in normal (unfailed) state. The amount can range from zero to an upper threshold in one embodiment. The imaging device 206 measures the amount of radiation passing from the upstream side 208 to the downstream side 210. The monitoring system 100 periodically receives the information from the imaging device 206 and determines if the amount of radiation has increased above a threshold level. If so, an indication may be provided to an external source. The information is provided in real time during operation of a turbomachine in one embodiment. In another embodiment, the information is provided while the turbomachine is not running.

FIG. 3 shows an alternative embodiment from which the monitoring system 100 may receive information. As shown, the monitoring system 100 is coupled to a plurality of cameras 302. While FIG. 3 illustrates cameras 302 it shall be understood that the cameras 302 may be replaced by any type of imaging devices. Each of the cameras 302 is coupled to the monitoring system 100 by a communication link 303. In one embodiment, the communication link 303 may be formed by individual wires or fibers (e.g., optical fiber) that separately connect each camera 302 to the monitoring system 100. In another embodiment, the communication link 303 is a bus. In yet another embodiment, the communication link 303 is formed by a wireless connection. In addition, while the cameras 302 are shown as being directly connected to the monitoring system 100, it shall be understood that other elements may be between the cameras 302 and the monitoring as described above.

Each camera 302 is oriented to receive radiation (e.g., light) emitted from a radiation source 212 and passing through a multi-section member 304. In this example, the member 304 is a filter that includes a plurality of filter sections 306. Thus, in this example, a first camera 302a is arranged to receive radiation passing through a first filter section 306a, a second camera 302b is arranged to receive radiation passing through a second filter section 306b, a third camera 302c is arranged to receive radiation passing through a third filter section 306c and a fourth camera 302d is arranged to receive radiation passing through a fourth filter section 306d.

In the event that the member 304 develops an imperfection, such as a hole 308, the camera 302a directed at the section containing hole 308 (section 306a) will receive more radiation (indicated by ray 310) than the other cameras 302. Based on this increased radiation and with knowledge of which camera 302 is directed at which filter section 306, the monitoring system 100 may determine which filter section 306 includes a defect. A determination of which filter section 306 includes a defect may be beneficial because it may be very difficult to see by eye which filter may have failed during operation. Of course, the defect could exist at the junction of two filter sections 306. In such a case, two or more cameras may record an increase in radiation.

Many modifications to the system shown in FIG. 3 may be implemented without departing from the present invention. For example, an additional second member could be disposed between the member 304 and the cameras 302. The second member may have a high air permeability, be of such a substance or color to be more detectable under the applied radiation and might be cleanable and more robust or permanent than member 304. For instance, the second member may be a painted wire mesh. In another embodiment, dust or other substance could be injected upstream of the member 304 into the airflow, which is particularly visible under the radiation provided by radiation source 212. In another embodiment, either or both the radiation source 212 or the one or more cameras 302 could be moves such that they scan across the member 304. In this manner, increased sensitivity to leak location may be achieved.

In yet another embodiment, the radiation source 212 may be implemented as an array of sources. In such an embodiment, one of the array of radiation sources 212 could be switched on at a time. In this manner, either a single camera or the multiple cameras 302 may be able to more accurately determine the location of the leak.

Figure 4:
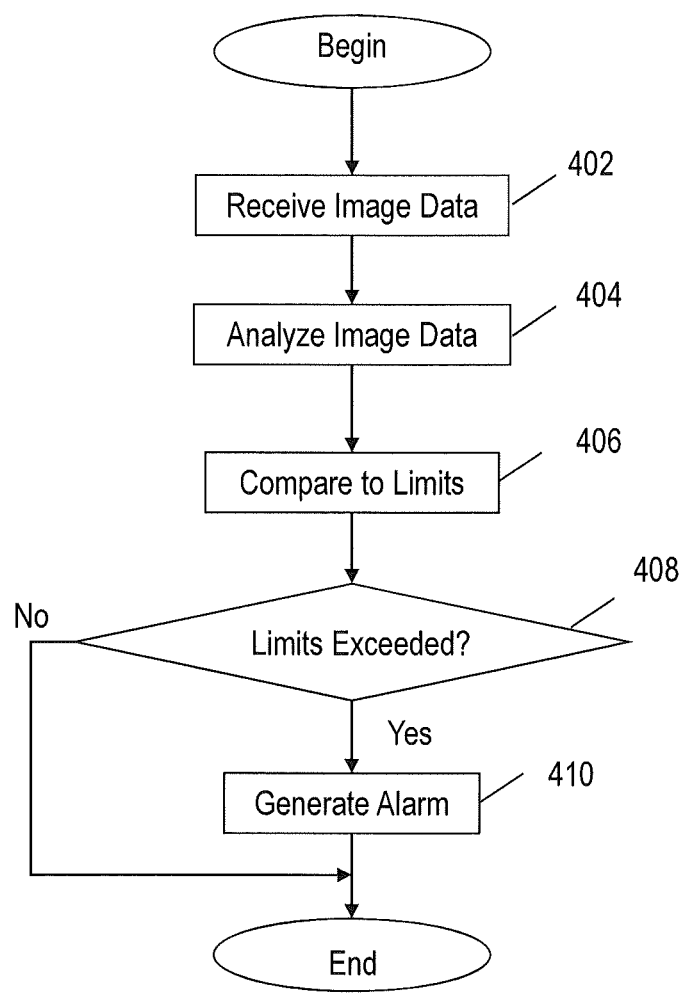
FIG. 4 is a flow chart showing a method according to one embodiment.

FIG. 4 is a flow chart of a method according to one embodiment. The method shown in FIG. 4 may be performed, for example, in the monitoring system 100 (FIGS. 1-3).

At a block 402 image data is received. The image data may be received directly from an imaging device or indirectly from the imaging device through another device. The imaging data may be received from one or from a plurality imaging devices. In one embodiment, the image data includes an indication of the amount of radiation incident on each pixel of the imaging device. Of course, the imaging data could include other information such as color and a time indicator.

At a block 404 the imaging data is analyzed. The analysis includes determining a radiation level for each pixel in one embodiment. Of course, other analysis tools, such as a neural network, could be utilized to analyze the radiation levels.

At a block 406 the analyzed data is compared to pre-stored or otherwise configured limits. The limits may be related to an amount of acceptable radiation received, a change or rate of change from an initial level and the like. In one embodiment, the limits are related to an amount of light received at each pixel.

At a block 408 it is determined if any of the limits have been exceeded. If the limits have been exceeded it is indicative of a failure of the member disposed between the imaging device and a radiation source. For example, in the event that the member is a filter, an increase in the amount of light passing through it may indicate that the filter has a hole in it.

In the event that the limits have been exceeded, at a block 410 an alarm is generated. Such an alarm may be provided directly to an operator or to another system or recorded for later use. In the event the limits have not been exceeded, the process ends and may be restarted upon receipt of new image data.

It shall be understood that while the terms "first," "second" and the like have been used to distinctly identify certain devices in the system 100, in the appended claims, the ordering and naming of certain devices may vary depending on the context.

In support of the teachings herein, various analysis components may be used, including digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement methods of the present invention. These instructions may provide for equipment operation, control, data collection and analysis and other functions deemed relevant by a system designer, owner, user or other such personnel, in addition to the functions described in this disclosure. Accordingly, an embodiment of the present invention includes a monitoring system implemented in a computing device that determines if a failure in a member has occurred based on an amount of radiation received by an imaging device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A monitoring system for monitoring the integrity of a member disposed within a machine, the monitoring system comprising:
   an imaging device disposed within the machine;
   a radiation source disposed within the machine that directs radiation at the member and the imaging device;
   an image analyzer that receives image data from the imaging device and determines an amount of radiation incident on one or more of one or more pixels of the imaging device; and
   a monitor coupled to the image analyzer that generates an alarm in the event an amount of radiation on one or more of the one or more pixels exceeds a limit, the alarm indicating that the member has failed;
   wherein the imaging device is disposed downstream of the member and the radiation source is disposed upstream of the member.

2. The monitoring system of claim 1, wherein the member is an air filter disposed within an air intake of the machine.

3. The monitoring system of claim 1, wherein the imaging device is a camera.

4. The monitoring system of claim 1, wherein the radiation is light.

5. The monitoring system of claim 1, wherein the radiation is one of visible light, ultraviolet light or infrared light.

6. The monitoring system of claim 1, wherein the imaging device is formed by a plurality of cameras.

7. The monitoring system of claim 6, wherein the plurality of cameras are directed at different portions of the member.

8. The monitoring system of claim 6, wherein the alarm indicated which portion of the member has failed.

9. The monitoring system of claim 1, wherein the member, the radiation source and the imaging device are disposed within an air duct of the machine.

10. The monitoring system of claim 1, wherein the imaging device is directly coupled to the monitoring system.

11. The monitoring system of claim 1, wherein the machine is a turbomachine.

12. The monitoring system of claim 1, in combination with the member and further comprising:
    an additional member downstream of the member.

13. The monitoring system of claim 12, wherein the additional member is a painted wire mesh and is permanently installed.

14. A monitoring system for monitoring the integrity of a member disposed within a machine, the monitoring system comprising:
    an imaging device disposed within the machine;
    a radiation source disposed within the machine that directs radiation at the member and the imaging device;
    an image analyzer that receives image data from the imaging device and that determines an amount of radiation incident on one or more of one or more pixels of the imaging device; and
    a monitor coupled to the image analyzer that generates an alarm in the event an amount of radiation on one or more of the one or more pixels exceeds a limit, the alarm indicating that the member has failed;
    wherein the imaging device is disposed downstream of the member and the radiation source is disposed upstream of the member.

15. The monitoring system of claim 14, wherein the imaging device is formed by a plurality of cameras.

16. The monitoring system of claim 15, wherein the plurality of cameras are directed at different portions of the member.

17. The monitoring system of claim 15, wherein the alarm indicated which portion of the member has failed.

18. The monitoring system of claim 14, wherein the member, the radiation source and the imaging device are disposed within an air duct of the machine.

19. The monitoring system of claim 14, wherein the imaging device is directly coupled to the monitoring system.

20. A method of monitoring a member in an air duct of a machine, the method comprising:
    placing a radiation source within the air duct on a first side of member;
    disposing an imaging device within the air duct on an second side of member;
    illuminating the first side of the member with radiation from the radiation source;
    receiving image data from the imaging device, the imaging data including information related to an amount of radiation that passed through the member and is incident on pixels of the imaging device;
    comparing the image data to radiation limits; and generating an alarm when the image data exceeds the radiation limits.

21. The method of claim 20, wherein the imaging device is a camera.

22. The method of claim 20, wherein the radiation source produces one of visible light, ultraviolet light and infrared light.

23. The method of claim 20, wherein illuminating includes directing the radiation towards a reflector arranged to reflect the radiation towards the first side of the member.

24. The method of claim 20, wherein the radiation source is formed by a plurality of individual radiation sources and further comprising:
   selectively activating each of the plurality of individual radiation sources.

25. The method of claim 20, wherein the member is an air filer.

26. The method of claim 20, further comprising:
   permanently installing a second member downstream of the member.

27. The method of claim 26, wherein the member is a painted wire mesh.

28. The method of claim 20, wherein the machine is a turbomachine.

29. The method of claim 20, further comprising:
   introducing dust to the air duct to enhance detection of leaks.

30. The method of claim 29, wherein the dust is visible under the radiation provided by a radiation source.

\* \* \* \* \*